United States Patent
Zhang et al.

(10) Patent No.: US 8,139,883 B2
(45) Date of Patent: Mar. 20, 2012

(54) SYSTEM AND METHOD FOR IMAGE AND VIDEO ENCODING ARTIFACTS REDUCTION AND QUALITY IMPROVEMENT

(75) Inventors: Ximin Zhang, San Jose, CA (US); Ming-Chang Liu, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 903 days.

(21) Appl. No.: 12/221,011

(22) Filed: Jul. 29, 2008

(65) Prior Publication Data
US 2010/0027905 A1    Feb. 4, 2010

(51) Int. Cl.
G06K 9/40 (2006.01)
H04N 5/00 (2011.01)

(52) U.S. Cl. ............... 382/254; 348/607

(58) Field of Classification Search .......... 382/173, 382/239, 250, 251, 254, 261, 266, 268, 269, 382/270, 272, 274, 275, 279, 305, 312, 199; 375/240.02, 240.03, 240.24, 240.29, 254; 348/606, 607, 241; 345/582; 358/3.27
See application file for complete search history.

(56) References Cited

U.S. PATENT DOCUMENTS

| | | | |
|---|---|---|---|
| 5,094,899 A | 3/1992 | Rusek, Jr. | |
| 5,635,994 A | 6/1997 | Drexler et al. | |
| 5,638,128 A | 6/1997 | Hoogenboom et al. | |
| 5,642,166 A | 6/1997 | Shin et al. | |
| 5,852,475 A | 12/1998 | Gupta et al. | 348/606 |
| 5,982,951 A * | 11/1999 | Katayama et al. | 382/284 |
| 6,278,736 B1 | 8/2001 | De Haan et al. | |
| 6,473,462 B1 | 10/2002 | Chevance et al. | |
| 6,658,059 B1 | 12/2003 | Lu et al. | |
| 6,744,916 B1 | 6/2004 | Takahashi | |
| 7,003,174 B2 * | 2/2006 | Kryukov et al. | 382/266 |
| 7,127,122 B2 * | 10/2006 | Ogata et al. | 382/260 |
| 7,203,234 B1 * | 4/2007 | Zeng | 375/240.03 |
| 7,206,002 B2 | 4/2007 | Kawamoto | |
| 7,260,148 B2 | 8/2007 | Sohm | |
| 7,346,224 B2 * | 3/2008 | Kong et al. | 382/261 |

(Continued)

FOREIGN PATENT DOCUMENTS

EP    0 720 382 B1    7/1996

(Continued)

OTHER PUBLICATIONS

Tai-Wai Chang et al., "A Novel Content—Adaptive Interpolation", 2005, pp. 6260-6263, Department of Electrical and Electronic Engineering, Hong Kong University of Science and Technology, Hong Kong.

(Continued)

*Primary Examiner* — Kanjibhai Patel
(74) *Attorney, Agent, or Firm* — Haverstock & Owens LLP

(57) ABSTRACT

Reducing artifacts and improving quality for image and video encoding is performed in one pass to preserve natural edge smoothness and sharpness. To reduce artifacts and improve quality, several steps are implemented including spatial variation extraction, determining if a block is flat or texture/edge, classifying the pixels as texture or noise, detecting a dominant edge, checking the spatial variation of neighboring blocks, generating base weights, generating filter coefficients, filtering pixels and adaptive enhancement. A device which utilizes the method of reducing artifacts and improving quality achieves higher quality images and/or video with reduced artifacts.

63 Claims, 4 Drawing Sheets

U.S. PATENT DOCUMENTS

| | | | |
|---|---|---|---|
| 7,822,286 B2 * | 10/2010 | Yea et al. | 382/260 |
| 7,995,649 B2 * | 8/2011 | Zuo et al. | 375/240.03 |
| 2005/0094852 A1 | 5/2005 | Kumar et al. | |
| 2005/0094899 A1 | 5/2005 | Kim et al. | |
| 2005/0100235 A1 | 5/2005 | Kong et al. | 382/261 |
| 2006/0050795 A1 | 3/2006 | Boroczky et al. | 375/240.29 |
| 2006/0083407 A1 | 4/2006 | Zimmermann et al. | |
| 2006/0110062 A1 | 5/2006 | Chiang et al. | 382/260 |
| 2006/0139376 A1 | 6/2006 | Le Dinh et al. | |

FOREIGN PATENT DOCUMENTS

| | | |
|---|---|---|
| WO | 87/05769 | 9/1987 |
| WO | 92/19068 | 10/1992 |
| WO | 95/24096 | 9/1995 |
| WO | 2006/089557 A1 | 8/2006 |

OTHER PUBLICATIONS

Lei Zhang et al., "An Edge-Guided Image Interpolation Algorithm via Directional Filtering and Data Fusion", Aug. 2006, vol. 15, No. 8, pp. 2226-2238, IEEE Transactions on Image Processing.

Sanjeev Kumar et al., "Global Motion Estimation in Frequency and Spatial Domain" Department of Electrical and Computer Engineering, UCSD, La Jolla, California, 2004.

Loy Hui Chein et al., "Robust Motion Estimation for Video Sequences Based on Phase-Only Correlation" Graduate School of Information Sciences, Tohoku University, Japan, Signal and Image Processing, Aug. 23-25, 2004, Honolulu, Hawaii, USA pp. 441-446.

T. Vlachos, "Simple method for estimation of global motion parameters using sparse translation motion vector fields", Electronics Letters Jan. 8, 1998, vol. 34, No. 1.

Hao-Song Kong et al., "Edge MAP Guided Adaptive Post-Filter for Blocking and Ringing Artifacts Removal", IEEE International Symposium on Circuits and Systems (ISCAS), vol. 3, p. 929-932, May 2004( IEEE Xplore).

L. Atzori, et al., "Low-Complexity Post-Processing for Artifact Reduction in Block-DCT Based Video Coding", Image Process, 2000, Proceedings 2000 International Conference on vol. 2, pp. 668-671, Feb. 2000.

H. Huu et al., "Simultaneous Coding Artifact Reduction and Sharpness Enhancement", Consumer Electronics, 2007, ICCR 2007, Jan. 2007, pp. 1-2.

Ling Shao et al., "Integrated Image Enhancement and Artifacts Reduction Based on Frequency Bands Manipulation", Jul. 2007, pp. 292-295, Multimedia and Expo, 2007 IEEE International Conference.

Thomas Meier et al., "Reduction of Blocking Artifacts in Image and Video Coding", Apr. 1999, pp. 490-500, Circuits and Systems for Video Technology, IEEE Transactions on vol. 9, Issue 3.

* cited by examiner

SYSTEM AND METHOD FOR IMAGE AND VIDEO ENCODING ARTIFACTS REDUCTION AND QUALITY IMPROVEMENT

FIELD OF THE INVENTION

The present invention relates to the field of image/video processing. More specifically, the present invention relates to enhancing the image/video processing by reducing artifacts and improving quality.

BACKGROUND OF THE INVENTION

A video sequence consists of a number of pictures, usually called frames. Subsequent frames are very similar, thus containing a lot of redundancy from one frame to the next. Before being efficiently transmitted over a channel or stored in memory, video data is compressed to conserve both bandwidth and memory. The goal is to remove the redundancy to gain better compression ratios. A first video compression approach is to subtract a reference frame from a given frame to generate a relative difference. A compressed frame contains less information than the reference frame. The relative difference can be encoded at a lower bit-rate with the same quality. The decoder reconstructs the original frame by adding the relative difference to the reference frame.

A more sophisticated approach is to approximate the motion of the whole scene and the objects of a video sequence. The motion is described by parameters that are encoded in the bit-stream. Pixels of the predicted frame are approximated by appropriately translated pixels of the reference frame. This approach provides an improved predictive ability over a simple subtraction approach. However, the bit-rate occupied by the parameters of the motion model must not become too large.

In general, video compression is performed according to many standards, including one or more standards for audio and video compression from the Moving Picture Experts Group (MPEG), such as MPEG-1, MPEG-2, and MPEG-4. Additional enhancements have been made as part of the MPEG-4 part 10 standard, also referred to as H.264, or AVC (Advanced Video Coding). Under the MPEG standards, video data is first encoded (e.g. compressed) and then stored in an encoder buffer on an encoder side of a video system. Later, the encoded data is transmitted to a decoder side of the video system, where it is stored in a decoder buffer, before being decoded so that the corresponding pictures can be viewed.

MPEG is used for the generic coding of moving pictures and associated audio and creates a compressed video bit-stream made up of a series of three types of encoded data frames. The three types of data frames are an intra frame (called an I-frame or I-picture), a bi-directional predicated frame (called a B-frame or B-picture), and a forward predicted frame (called a P-frame or P-picture). These three types of frames can be arranged in a specified order called the GOP (Group Of Pictures) structure. I-frames contain all the information needed to reconstruct a picture. The I-frame is encoded as a normal image without motion compensation. On the other hand, P-frames use information from previous frames and B-frames use information from previous frames, a subsequent frame, or both to reconstruct a picture. Specifically, P-frames are predicted from a preceding I-frame or the immediately preceding P-frame.

Besides MPEG standards, JPEG is used for the generic coding of still picture. Since the encoding of still picture can be considered as the encoding of an I frame in video, no introduction of JPEG will be provided here. There are some other proprietary methods for image/video compression. Most of them adopt similar technologies as MPEG and JPEG. Basically, each picture is separated into one luminance (Y) and two chrominance channels (also called color difference signals Cb and Cr). Blocks of the luminance and chrominance arrays are organized into "macroblocks," which are the basic unit of coding within a frame. Block based transformation and quantization of transform coefficients are used to achieve high compression efficiency.

Since quantization is a lossy process, the combination of block-based transform and quantization is able to generate perceptually annoying artifacts such as ringing artifacts and blocking artifacts. Since coding artifact reduction is fundamental to many image processing applications, it has been investigated for many years. Many post-processing methods have been proposed. In general, most methods focus on blocking artifacts reduction or ringing artifacts reduction. Although some methods show good results on selected applications, the quality is not high enough on new digital HDTV. As a result, either the artifacts are still visible or the texture detail is blurred.

Recently, more and more families are replacing their old CRT television with large screen LCD or Plasma televisions with high definition. While the new technologies provide better experience with higher resolution and more detail, they also reveal more obvious artifacts and noise if the contents are not high enough quality. For instance, displaying a YouTube® video clip on the HDTV will show very ugly coding artifacts.

SUMMARY OF THE INVENTION

Reducing artifacts and improving quality for image and video encoding is performed in one pass to preserve natural edge smoothness and sharpness. To reduce artifacts and improve quality, several steps are implemented including spatial variation extraction, determining if a block is flat or texture/edge, classifying the pixels as texture or noise, detecting a dominant edge, checking the spatial variation of neighboring blocks, generating base weights, generating filter coefficients, filtering pixels and adaptive enhancement. A device which utilizes the method of reducing artifacts and improving quality achieves higher quality images and/or video with reduced artifacts.

In one aspect, a method of reducing image/video encoding artifacts and improving quality within a computing device comprises classifying each block in an image/video using pixel intensity range-based block classification, detecting a dominant edge using vector difference-based dominant edge detection, generating content adaptive base weights using content adaptive base weight generation, generating content adaptive filter weights using content adaptive final filter weight generation and enhancing textures and edges using adaptive texture and edge enhancement. Classifying each block includes classifying a block as a flat block by comparing an intensity range with a threshold and determining the intensity range is less than or equal to the threshold. Classifying each block includes classifying a block as a texture/edge block by comparing an intensity range with a threshold and determining the intensity range is greater than the threshold. A pixel intensity range-based block classification includes: determining a maximum intensity pixel value within a current block, determining a minimum intensity pixel value within the current block and calculating a spatial variation by subtracting the minimum intensity pixel value from the maximum intensity pixel value. The method further comprises classifying each pixel in a current block. Classifying each pixel comprises: calculating a median of an intensity range within the current block, attributing a pixel in the current block to a first class if the pixel's intensity value is larger than the median and attributing the pixel in the current block to a second class if the pixel's intensity value is less than or equal to the median. Classifying each pixel further comprises comparing a pixel's class with a class of neighboring pixels and denoting the pixel as noisy if the pixel's class and the class of the neighboring pixels is the same. The vector difference-based dominant edge detection includes calculating a vector difference between two pixels. The vector difference-based dominant edge detection includes: determining a minimum difference among four directional differences, selecting a maximum difference with a direction orthogonal to the minimum difference direction, calculating an edge difference and determining if a pixel belongs to a dominant edge. The content adaptive base weight generation includes calculating base weights for noisy pixels, edge pixels and texture pixels. The content adaptive base weight generation includes calculating base weights for a texture pixel with flat neighbor blocks. The content adaptive base weight generation includes adjusting base weights for chrominance blocks. The content adaptive final filter weight generation includes calculating a final weight for a texture/edge block. The content adaptive final filter weight generation includes calculating a final weight for a flat block. The adaptive texture and edge enhancement includes applying sharpness enhancement on denoted edge/texture pixels. The adaptive texture and edge enhancement includes: not applying sharpness enhancement if a current pixel belongs to a flat block, not applying sharpness enhancement if the current pixel is a noisy pixel, enhancing sharpness if the current pixel belongs to a dominant edge and enhancing sharpness if the current pixel has not been filtered. The computing device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In another aspect, a method of reducing image/video encoding artifacts and improving quality within a computing device comprises classifying each block within an image/video, determining filter coefficients for each pixel in a current block, filtering each pixel with the filter coefficients to remove noise and applying an adaptive enhancement to enhance texture and edge pixels. Classifying each block includes classifying a block as one of a flat block and a texture/edge block. Classifying each block includes classifying a block as the flat block by comparing an intensity range with a threshold and determining the intensity range is less than or equal to the threshold. Classifying each block includes classifying a block as the texture/edge block by comparing an intensity range with a threshold and determining the intensity range is greater than the threshold. Determining the intensity range of the pixel includes: determining a maximum intensity pixel value within a current block, determining a minimum intensity pixel value within the current block and calculating a spatial variation by subtracting the minimum intensity pixel value from the maximum intensity pixel value. The method further comprises classifying each pixel comprising calculating a median of an intensity range within the current block, attributing a pixel in the current block to a first class if the pixel's intensity value is larger than the median and attributing the pixel in the current block to a second class if the pixel's intensity value is less than or equal to the median. Classifying each pixel further comprises comparing a pixel's class with a class of neighboring pixels and denoting the pixel as noisy if the pixel's class and the class of the neighboring pixels is the same. Determining the filter coefficients includes detecting a dominant edge and classifying pixel intensity for a texture/edge block. Determining the filter coefficients includes determining intensity difference between the current pixel and neighboring pixels for a flat block. Detecting the dominant edge includes calculating a vector difference between two pixels. Detecting the dominant edge includes: determining a minimum difference among four directional differences, selecting a maximum difference with a direction orthogonal to the minimum difference direction, calculating an edge difference and determining if a pixel belongs to the dominant edge. Applying the adaptive enhancement includes applying sharpness enhancement on denoted edge/texture pixels. Applying the adaptive enhancement includes: not applying sharpness enhancement if a current pixel belongs to a flat block, not applying sharpness enhancement if the current pixel is a noisy pixel, enhancing sharpness if the current pixel belongs to a dominant edge and enhancing sharpness if the current pixel has not been filtered. The computing device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In another aspect, a system for reducing image/video encoding artifacts and improving quality implemented with a computing device comprises a spatial variation extraction module configured for extracting spatial variation information for each block of an image/video, a block detection module operatively coupled to the spatial variation extraction module, the block detection module configured for classifying each block using the spatial variation information, a classification module operatively coupled to the spatial variation extraction module, the classification module configured for classifying each pixel in a current block using the spatial variation information, a dominant edge detection module operatively coupled to the block detection module, the dominant edge detection module configured for detecting a dominant edge, a neighbor block check module operatively coupled to the dominant edge detection module, the neighbor block check module configured for checking spatial variation of neighboring blocks of the current block, a base weight generation module operatively coupled to the neighbor block check module, the base weight generation module configured for generating base weights by combining results from detecting the dominant edge and checking the spatial variation of neighboring blocks, a filter coefficients generation module operatively coupled to the base weight generation module, the filter coefficients generation module configured for generating filter coefficients, a pixel-based filtering module operatively coupled to the filter coefficients generation module, the pixel-based filtering module configured for filtering pixels and an adaptive enhancement module operatively coupled to the pixel-based filtering module, the adaptive enhancement module configured for applying an adaptive enhancement to enhance texture and edge pixels. The block detection module classifies a block as a flat block by comparing an intensity range with a threshold and determining the intensity range is less than or equal to the threshold. The block detection module classifies a block as a texture/edge block by comparing an intensity range with a threshold and determining the intensity range is greater than the threshold. The spatial variation information comprises an intensity range. Determining the intensity range of the pixel includes: determining a maximum intensity pixel value within a current block, determining a minimum intensity pixel value within the current block and calculating a spatial variation by subtracting the minimum intensity pixel value from the maximum intensity pixel value. The classification module classifies each pixel by calculating a median of an intensity range within the current block, attributing a pixel in the current block to a first class if the pixel's intensity value is larger than the median and attributing the pixel in the current block to a second class if the pixel's intensity value is less than or equal to the median. Classifying each pixel further comprises comparing a pixel's class with a class of neighboring pixels and denoting the pixel as noisy if the pixel's class and the class of the neighboring pixels is the same. The dominant edge detector module detects the dominant edge by calculating a vector difference between two pixels. The dominant edge detector module detects the dominant edge by determining a minimum difference among four directional differences, selecting a maximum difference with a direction orthogonal to the minimum difference direction, calculating an edge difference and determining if a pixel belongs to the dominant edge. The base weight generation module calculates the base weights for noisy pixels, edge pixels and texture pixels. The base weight generation module calculates the base weights for a texture pixel with flat neighbor blocks. The base weight generation module adjusts the base weights for chrominance blocks. The adaptive enhancement modules applies sharpness enhancement on denoted edge/texture pixels. Applying the adaptive enhancement includes: not applying sharpness enhancement if a current pixel belongs to a flat block, not applying sharpness enhancement if the current pixel is a noisy pixel, enhancing sharpness if the current pixel belongs to a dominant edge and enhancing sharpness if the current pixel has not been filtered. The spatial variation extraction module, the block detection module, the classification module, the dominant edge detection module, the neighbor block check module, the base weight generation module, the filter coefficients generation module, the pixel-based filtering module and the adaptive enhancement module are implemented in software. The spatial variation extraction module, the block detection module, the classification module, the dominant edge detection module, the neighbor block check module, the base weight generation module, the filter coefficients generation module, the pixel-based filtering module and the adaptive enhancement module are implemented in hardware. The spatial variation extraction module, the block detection module, the classification module, the dominant edge detection module, the neighbor block check module, the base weight generation module, the filter coefficients generation module, the pixel-based filtering module and the adaptive enhancement module are implemented in at least one of software, firmware and hardware. The computing device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In another aspect, a device comprises a memory for storing an application, the application configured for: extracting spatial variation information for each block of an image/video, classifying each block using the spatial variation information, classifying each pixel in a current block using the spatial variation information, detecting a dominant edge, checking spatial variation of neighboring blocks of the current block, generating base weights by combining results from detecting the dominant edge and checking the spatial variation of neighboring blocks, generating filter coefficients, filtering pixels using the filter coefficients and applying an adaptive enhancement to enhance texture and edge pixels and a processing component coupled to the memory, the processing component configured for processing the application. Classifying each block includes classifying a block as a flat block by comparing an intensity range with a threshold and determining the intensity range is less than or equal to the threshold. Classifying each block includes classifying a block as a texture/edge block by comparing an intensity range with a threshold and determining the intensity range is greater than the threshold. The spatial variation information comprises an intensity range. Determining the intensity range of the pixel includes: determining a maximum intensity pixel value within a current block, determining a minimum intensity pixel value within the current block and calculating a spatial variation by subtracting the minimum intensity pixel value from the maximum intensity pixel value. Classifying each pixel comprises calculating a median of an intensity range within the current block, attributing a pixel in the current block to a first class if the pixel's intensity value is larger than the median and attributing the pixel in the current block to a second class if the pixel's intensity value is less than or equal to the median. Classifying each pixel further comprises comparing a pixel's class with a class of neighboring pixels and denoting the pixel as noisy if the pixel's class and the class of the neighboring pixels is the same. Detecting the dominant edge includes calculating a vector difference between two pixels. Detecting the dominant edge includes: determining a minimum difference among four directional differences, selecting a maximum difference with a direction orthogonal to the minimum difference direction, calculating an edge difference and determining if a pixel belongs to the dominant edge. Generating the base weights includes calculating the base weights for noisy pixels, edge pixels and texture pixels. Generating the base weights includes calculating the base weights for a texture pixel with flat neighbor blocks. Generating the base weights includes adjusting the base weights for chrominance blocks. Applying the adaptive enhancement includes applying sharpness enhancement on denoted edge/texture pixels. Applying the adaptive enhancement includes: not applying sharpness enhancement if a current pixel belongs to a flat block, not applying sharpness enhancement if the current pixel is a noisy pixel, enhancing sharpness if the current pixel belongs to a dominant edge and enhancing sharpness if the current pixel has not been filtered. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

DETAILED DESCRIPTION OF THE PREFERRED EMBODIMENT

A low complexity encoding artifacts reduction method to generate image and video with high quality is described herein. Unlike prior art methods that perform artifact reduction and sharpness enhancement separately, the two tasks are able to be accomplished in one pass. First, the current block is detected as a flat block or a texture/edge block. For the texture/edge blocks, a vector-based dominant edge detection and pixel intensity classification is combined to determine the coefficients of a 3×3 filter for each pixel in the current block. For the flat block, the filter coefficients are only determined by the intensity difference between the current pixel and its neighbor pixels. The obtained filter is then applied to this pixel to remove the quantization noise including the ringing noise. After the filtering, an adaptive enhancement is applied. By using the information obtained during the filtering process, only the natural edge and texture are enhanced. As a result, better visual quality is obtained compared to the prior art.

Through many years of investigation by researchers around the world, it is acknowledged that the encoding artifacts are content dependent. Various content analysis including spatial variation extraction, dominant edge detection, neighbor condition check and pixel classification are utilized herein.

Figure 1:
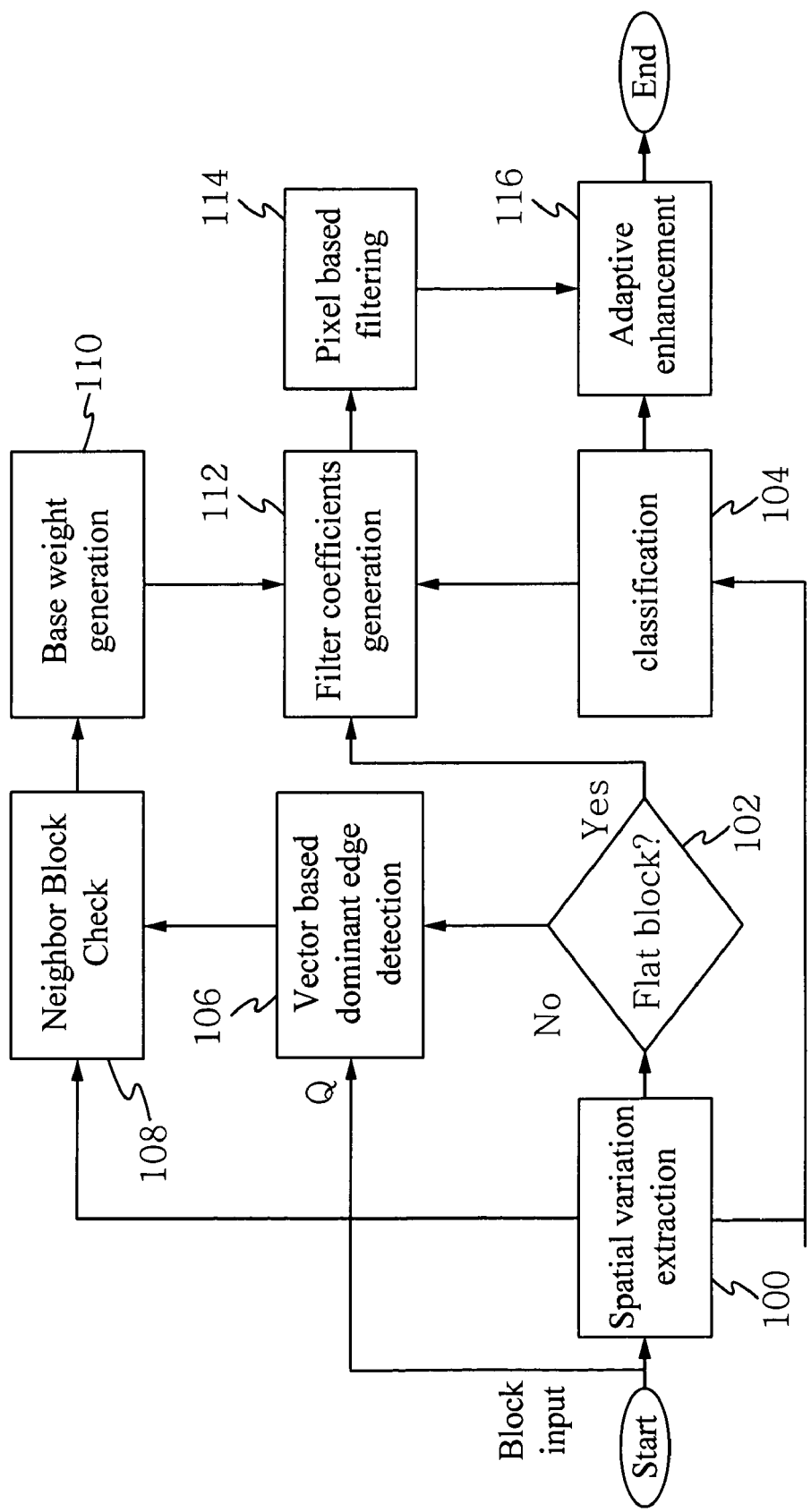
FIG. 1 illustrates a flow chart of the method of reducing artifacts and enhancing quality.

The overall scheme of the method of reducing artifacts and enhancing quality is shown in FIG. 1. The spatial intensity variation is analyzed and extracted for each block in the step 100. Based on the extracted spatial variation result, the current block is attributed to either a flat block or a texture/edge block, in the step 102. The information obtained during the spatial variation extraction is also utilized in the classification module, in the step 104. In the classification module, every pixel in the current block is classified. The classification result is able to be utilized in the subsequent module to help determine if the current pixel belongs to texture or noise. If the current block is determined as a texture/edge block, dominant edge detection is applied to every pixel in the current macroblock, in the step 106. This detection is based on the vector-based similarity calculation, the spatial variation information and the quantization value of the current block. All of the pixels within the current block are determined either as edge pixels or texture pixels.

Figure 2:
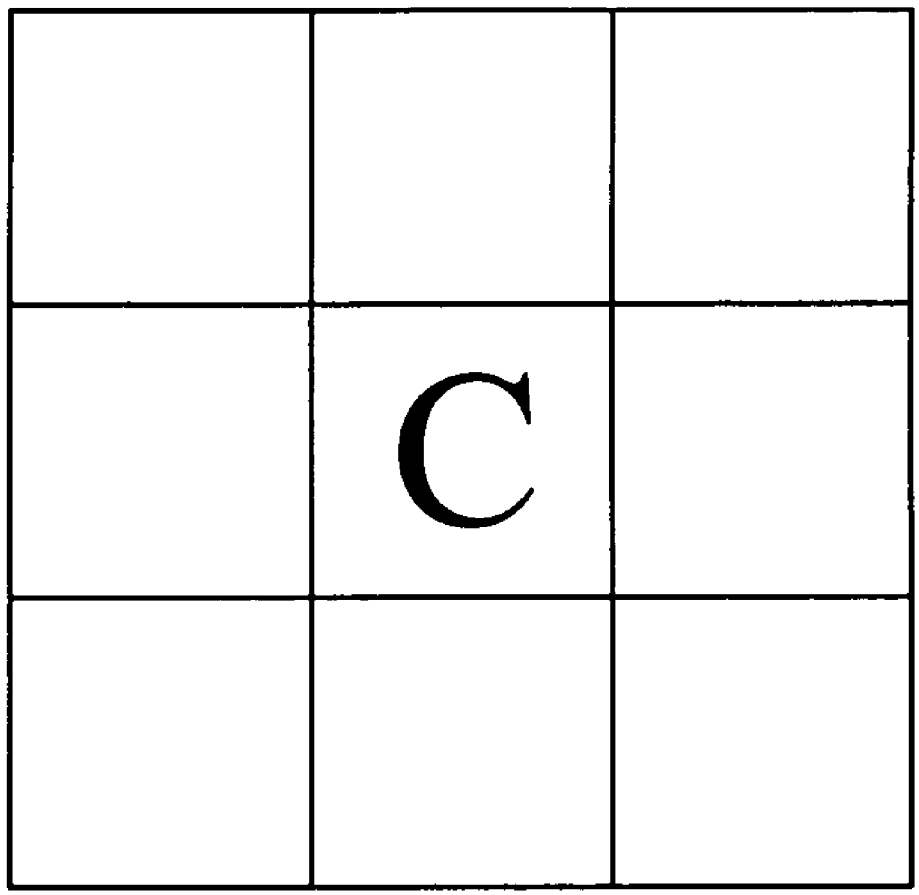
FIG. 2 illustrates a block diagram of a center block and neighboring blocks.

At the same time of dominant edge detection, the spatial variation of the 8-neighbor blocks around the current block is also checked, in the step 108. The 8-neighbor blocks are illustrated in FIG. 2. If at least one 8-neighbor block is a very smooth block, then the noise sensitivity is much higher in the current block.

By combining the dominant edge detection and neighbor block check result, the base weights of the N×N filter are generated, in the step 110. Since the human visual system is not sensitive to the quantization noise in the texture area, if the current pixel is determined as a texture pixel, smaller weight is assigned. If the current pixel is determined as an edge pixel, a bigger weight is assigned to the pixels along the edge. This base weight is then adjusted based on the classification result and pixel vector difference to determine the final filter coefficients.

If the current block is determined as a flat block, there are no edge and texture pixels within the block. Therefore, edge detection and classification is unnecessary. The filter coefficients are generated in the step 112 and are totally based on the pixel difference between the current pixel and its neighboring pixels.

After the filter coefficients are obtained, the pixels in the current block are filtered in the step 114 as follows:

$$Y_{i,j} = \frac{\sum_{k=-1}^{N} \sum_{l=-1}^{N} W_{i+k,j+l} \cdot P_{i+k,j+l}}{\sum_{k=-1}^{N} \sum_{l=-1}^{N} W_{i+k,j+l}}$$

In the above equation, i and j denote position of the pixel to be filtered. $P_{i+k,j+l}$ denotes the decoded pixels that are used in the filtering process. $W_{j+k,j+l}$ denotes the filter coefficient for the corresponding pixels and $Y_{i,j}$ denotes the filter result. Under most circumstances, N=3 is sufficient for artifact removal. In the following, N=3 is used; however, in some embodiments N is equal to another number.

Then, in the step 116, an adaptive enhancement method is applied to enhance the texture and edge pixels. By utilizing the information obtained during the filtering process, the noise is differentiated from the texture pixels. Therefore, the enhancement is able to avoid amplifying the noise.

As described above, the first stage of the method of reducing artifacts and enhancing quality is spatial variation extraction. The spatial variation is able to be measured by many different methods—from very complicated entropy estimation to simple sub-block pixel intensity mean difference. Since an objective is to obtain information for encoding noise reduction, the "good enough" low complexity solution is desirable. With this in mind, the pixel intensity range within the current block as the measure of the spatial variation of each block is used. The intensity range is able to be obtained by the following procedure:

Determining the maximum intensity pixel value $P_{MAX}$ within the current block;

Determining the minimum intensity pixel value $P_{MIN}$ within the current block; and Calculating the spatial variation (or intensity range) as $BK_{range} = P_{MAX} - P_{MIN}$.

To determine if a block is a flat block or a texture/edge block, the $BK_{range}$ is compared with a threshold T(Q). If the range is larger than T(Q), the current block is attributed to a texture/edge block. Otherwise, the current block is attributed to a flat block. Here, T(Q) is a function of the quantization parameter. When Q is increased, T(Q) is also increased.

The classification module plays an important role to differentiate the noise from texture/edge. The following procedure is used to classify each pixel in the current block:

Calculating the median of the intensity range within the current block as $P_{Median} = (P_{MAX} + P_{MIN})/2$; and For each Pixel in the current block, attributing them into two classes using the following procedure:

If the pixel's intensity value is larger than $P_{Median}$, the pixel is attributed to class one; and If the pixel's intensity value is less or equal to $P_{Median}$, the pixel is attributed to class two.

To determine if a pixel is heavily affected by the encoding artifacts, the classification result of the pixel is compared to its eight neighboring pixels. If all of them share the same class, the pixel is very likely to be heavily affected by the encoding artifacts and is denoted as a noisy pixel. Otherwise, the pixel is denoted as a texture/edge pixel. If the pixel is denoted as a texture/edge pixel, the pixel is classified into either a texture or an edge pixel at a later stage.

The filter weight (coefficients strength) is dependent on the following information: if the current pixel is denoted as a noisy pixel based on the classification; if the current pixel is located on a dominant edge; or if the filtered pixel pair is similar enough. To obtain the above information, dominant edge detection is used. There are many methods developed for edge detection. For reducing artifacts and enhancing quality, good enough edge detection is needed but with very low complexity.

Figure 3:
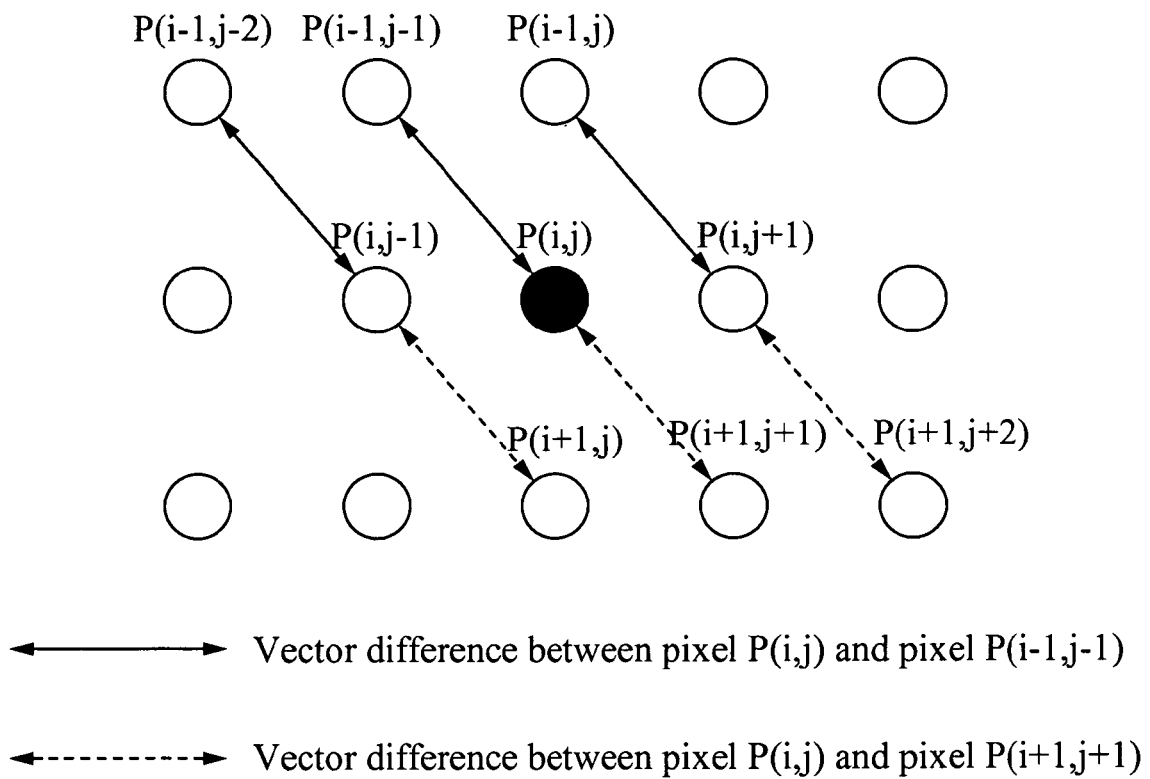
FIG. 3 illustrates a representation of a vector-based similarity measure.

A vector similarity-based dominant edge detection is based on the vector similarity measure which is illustrated by FIG. 3. As shown in the figure, P(i,j) denotes the current pixel, its difference with its upper left neighbor pixel P(i−1, j−1) is calculated by the following equation:

Diff(Upper_left)=|P(i,j)−P(i−1,j−1)|+|P(i,j−1)−P(i−1,j−2)|+|P(i,j+1)−P(i−1,j)|

Similarly, the difference with its other seven neighboring pixels are calculated by the following:

Diff(Lower_right)=|P(i,j)−P(i+1,j+1)|+|P(i,j−1)−P(i+1,j)|+|P(i,j+1)−P(i+1,j+2)|

Diff(Upper_right)=|P(i,j)−P(i−1,j+1)|+|P(i,j−1)−P(i−1,j)|+|P(i,j+1)−P(i−1,j+2)|

Diff(Upper)=|P(i,j)−P(i−1,j)|+|P(i,j−1)−P(i−1,j−1)|+|P(i,j+1)−P(i−1,j+1)|

Diff(Lower_left)=|P(i,j)−P(i+1,j−1)|+|P(i,j−1)−P(i+1,j−2)|+|P(i,j+1)−P(i+1,j)|

Diff(Lower)=|P(i,j)−P(i+1,j)|+|P(i,j−1)−P(i+1,j−1)|+|P(i,j+1)−P(i+1,j+1)|

Diff(Left)=|P(i,j)−P(i,j−1)|+|P(i−1,j)−P(i−1,j−1)|+|P(i+1,j)−P(i+1,j−1)|

Diff(Right)=|P(i,j)−P(i,j+1)|+|P(i−1,j)−P(i−1,j+1)|+|P(i+1,j)−P(i+1,j+1)|

Based on the similarity measure between the current pixel and its 8 neighboring pixels, the directional difference of vertical direction, horizontal direction, diagonal 45° direction and diagonal 135° direction are calculated by:

$DIFF_{ver}$=Diff(Upper)+Diff(Lower)

$DIFF_{hor}$=Diff(Left)+Diff(Right)

$DIFF_{dia45°}$=Diff(Upper_left)+Diff(Lower_right)+$C_1$ $DIFF_{dia135°}$=Diff(Upper_right)+Diff(Lower_left)+$C_1$ In the above equations, $C_1$ is a constant which reflects the fact that the human visual system is more sensitive to the vertical and horizontal edge compared to the diagonal edges. With the directionality measure as above, the dominant edge can be determined. The dominant edge is determined by the following procedure:

Determining the minimum Min(DIFF) among four directional difference $DIFF_{ver}$, $DIFF_{hor}$, $DIFF_{45°}$ and $DIFF_{135°}$;

Selecting the maximum difference with the direction orthogonal to the direction of Min(DIFF). Then, calculating the edge difference by:

Edge_Diff=Max(DIFF)−Min(DIFF); and

If the following condition is satisfied, the current pixel is determined to belong to a dominant edge and denoted as an edge pixel. The edge direction is the direction that generates the Min(DIFF). Otherwise, the current pixel is determined to belong to texture and denoted as a texture pixel.

Edge_Diff≧$BK_{range}$&&Min(DIFF)<$BK_{threshold}$

For the luminance block, the threshold value is calculated as:

$$BK_{threshold} = \begin{cases} T2 & BK_{range} > T2 \\ BK_{range} & \text{Otherwise} \end{cases}$$

For the chrominance block, the threshold value is calculated as:

$$BK_{threshold} = \begin{cases} T2 & BK_{range} > T2 \\ BK_{range} << 1 & \text{Otherwise} \end{cases}$$

With the dominant edge detection and classification results, the filter base weight is able to be generated as follows:

If a pixel is determined as a noisy pixel based on the classification or as an edge pixel, its base weight is calculated as follows:

$$W_{base} = \begin{cases} 16 & \text{Noisy-pixel} \\ 12 & \text{Edge\_diff} > 1.5 BK_{range} \\ 8 & \text{Edge\_diff} > BK_{range} \end{cases}$$

If a pixel is determined as a texture pixel, its base weight is calculated as follows. This means the base weight is 8 when the neighbor block check returns positive.

$$W_{base} = \begin{cases} 8 & \text{flat} - \text{neighbor} \\ 0 & \text{otherwise} \end{cases}$$

After the base weight is obtained, the final filter weights are calculated according to the following equation:

$$W_{i+k,j+l} = \begin{cases} 16, & k=0, l=0 \\ W_{base} - \dfrac{W_{base} \cdot DIFF(P_{i,j}, P_{i+k,j+l})}{BK_{threshold}}, & \text{Edge-direction} \\ \left(W_{base} - \dfrac{W_{base} \cdot DIFF(P_{i,j}, P_{i+k,j+l})}{BK_{threshold}}\right)/2, & \text{Other-directions} \end{cases}$$

According to the above equation, the maximum weight of the filtered pixel is 16. The neighbor pixels along the edge direction are heavy weighted. If the above calculation returns a negative weight value, the respective weight is set as zero. If the current pixel is a texture pixel with a flat neighbor, all of its neighbor pixels are treated equally. That means they all use the calculation for the edge direction.

Since there is not an edge in a flat block, the filtering process is relatively simple compared to the filtering process for a texture/edge block. The filter weights are calculated by the following equation:

$$W_{i+k,j+l} = \begin{cases} 16 & k=0, l=0 \\ 16 - \dfrac{16 \cdot DIFF(P_{i,j}, P_{i+k,j+l})}{BK_{range}} & \text{others} \end{cases}$$

Research has shown that the human visual system prefers a sharper picture compared to a mild picture under most scenarios. Therefore, sharpness enhancement is included in most consumer image & video products. When the input picture is noise free, the sharpness enhancement improves the visual quality. The sharpness enhancement makes the edge more sharp and the texture detail more visible. However, this enhancement is able to also amplify the noise or encoding artifacts. Sometimes, the picture appears worse after the sharpness enhancement. Even if the artifact reduction made the encoding artifacts unnoticeable, the sharpness enhancement is able to make them visible again. Therefore, the sharpness enhancement method that is able to avoid artifacts amplification is desirable.

In this application, the blocks within the picture have been classified into either a flat block or a texture/edge block. Within the texture/edge block, the pixels are denoted as an edge pixel, a noisy pixel or a texture pixel. By using this information, the following procedure is able to be used to enhance the picture:

If the current pixel belongs to a flat block, no sharpness enhancement is applied;

If the current pixel is denoted as a noisy pixel, no sharpness enhancement is applied;

If the current pixel belongs to a dominant edge, the sharpness is enhanced; and

If the current pixel has not been filtered, which means $W_{base}=0$, the sharpness is enhanced.

By using the above procedure, the artifacts amplification is avoided.

Figure 4:
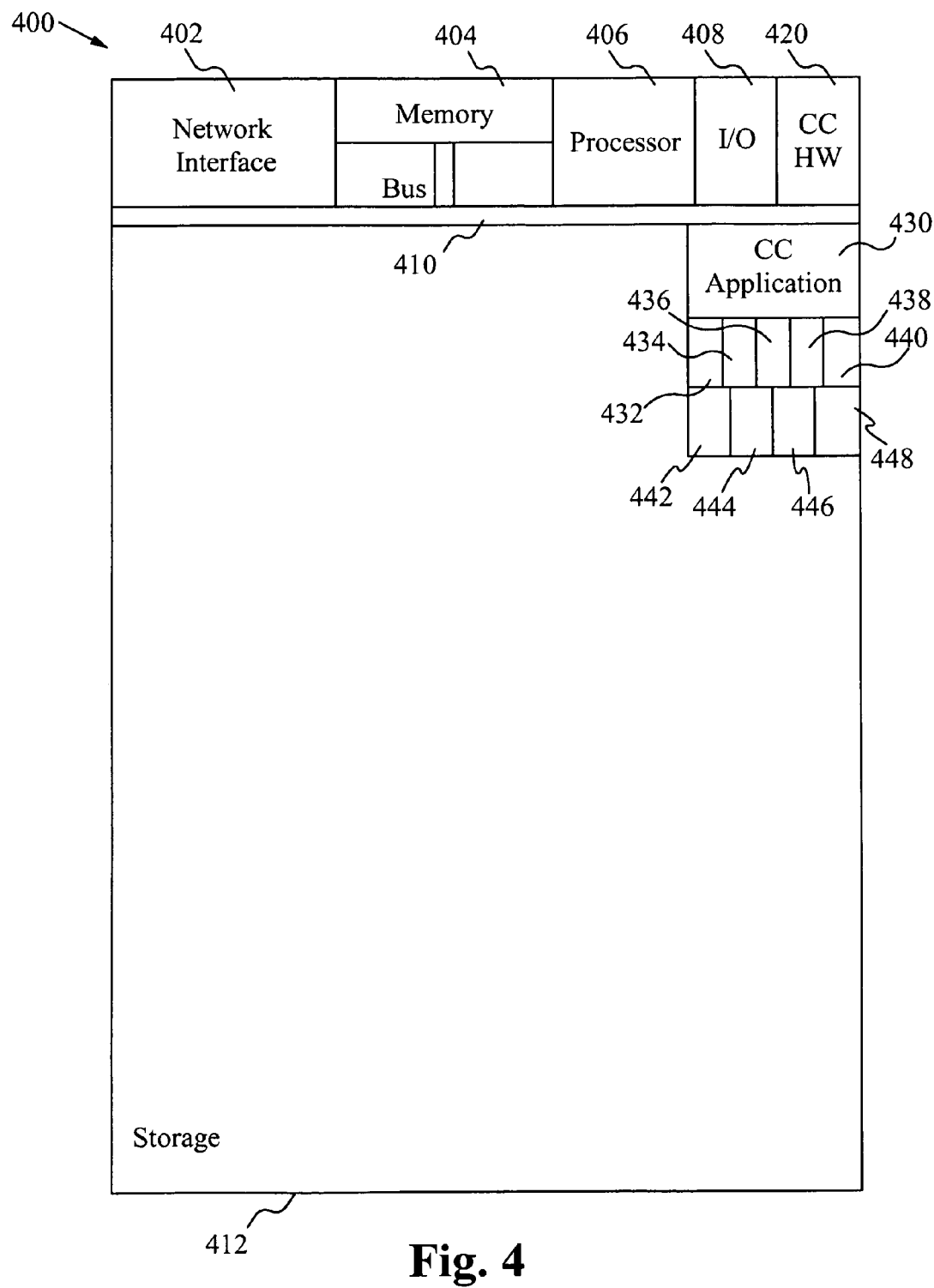
FIG. 4 illustrates a block diagram of an exemplary computing device configured to implement the method of reducing artifacts and improving quality for image and video encoding.

FIG. 4 illustrates a block diagram of an exemplary computing device 400 configured to implement the method of reducing artifacts and improving quality for image and video encoding. The computing device 400 is able to be used to acquire, store, compute, communicate and/or display information such as images and videos. For example, a computing device 400 acquires a video, and then the method for reducing artifacts and improving image/video encoding quality improves the appearance of the image/video. In general, a hardware structure suitable for implementing the computing device 400 includes a network interface 402, a memory 404, a processor 406, I/O device(s) 408, a bus 410 and a storage device 412. The choice of processor is not critical as long as a suitable processor with sufficient speed is chosen. The memory 404 is able to be any conventional computer memory known in the art. The storage device 412 is able to include a hard drive, CDROM, CDRW, DVD, DVDRW, flash memory card or any other storage device. The computing device 400 is able to include one or more network interfaces 402. An example of a network interface includes a network card connected to an Ethernet or other type of LAN. The I/O device(s) 408 are able to include one or more of the following: keyboard, mouse, monitor, display, printer, modem, touchscreen, button interface and other devices. Artifact reduction and quality improvement application(s) 430 used to perform the method of reducing artifacts and improving quality of images/video are likely to be stored in the storage device 412 and memory 404 and processed as applications are typically processed. More or less components shown in FIG. 4 are able to be included in the computing device 400. In some embodiments, artifact reduction and quality improvement hardware 420 is included. Although the computing device 400 in FIG. 4 includes applications 430 and hardware 420 for artifact reduction and quality improvement, the artifact reduction and quality improvement method is able to be implemented on a computing device in hardware, firmware, software or any combination thereof.

In some embodiments, the artifact reduction and quality improvement application(s) 430 include several applications and/or modules. In some embodiments, the artifact reduction and quality improvement application(s) 430 include a spatial variation extraction module 432, a flat or texture/edge block detection module 434, a classification module 436, a vector-based dominant edge detection module 438, a neighbor block check module 440, a base weight generation module 442, a filter coefficients generation module 444, a pixel-based filtering module 446 and an adaptive enhancement module 448.

As described above, the spatial variation extraction module 432 analyzes the spatial intensity variation for each block and extracts a spatial variation result. Based on the extracted spatial variation result, the flat or texture/edge block detection module 434 determines if the block is a flat block or a texture/edge block. The classification module 436 also uses the information obtained by the spatial variation extraction module 432 and classifies every pixel in the current block. The classification result is utilized to help determine if the current pixel belongs to texture or noise. The vector-based dominant edge detection module 438 applies vector-based dominant edge detection to every pixel in the current macroblock, if the block is determined to be a texture/edge block. The neighbor block check module 440 checks the spatial variation of the 8-neighbor blocks. The base weight generation module 442 generates base weights of the filter by combining the dominant edge detection and neighbor block check result. The filter coefficients generation module 444 generates filter coefficients depending on specified criteria. The pixel-based filtering module 446 filters pixels in the current block. The adaptive enhancement module 448 enhances the texture and edge pixels.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television, a home entertainment system or any other suitable computing device.

To utilize the artifact reduction and quality improvement method, a computing device operates as usual, but the video/image processing is improved in that the image or video quality is improved and artifacts are reduced. The utilization of the computing device from the user's perspective is similar or the same as one that uses standard operation. For example, the user still simply turns on a digital camcorder and uses the camcorder to record a video. The artifact reduction and quality improvement method is able to automatically improve the quality of the video without user intervention. The artifact reduction and quality improvement method is able to be used anywhere that requires image and/or video processing. Many applications are able to utilize the artifact reduction and quality improvement method.

In operation, the artifact reduction and quality improvement method enables many improvements related to image/video processing. By performing artifact reduction and sharpness enhancement in one pass, better image/video results are obtained. Furthermore, the specific implementation of artifact reduction and sharpness enhancement is an improved implementation over the prior art.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of reducing image/video encoding artifacts and improving quality within a computing device, the method comprising:
   a. classifying each block in an image/video using pixel intensity range-based block classification;
   b. detecting a dominant edge using vector difference-based dominant edge detection;
   c. generating content adaptive base weights using content adaptive base weight generation;
   d. generating content adaptive filter weights using content adaptive final filter weight generation; and
   e. enhancing textures and edges using adaptive texture and edge enhancement.

2. The method of claim 1 wherein classifying each block includes classifying a block as a flat block by comparing an intensity range with a threshold and determining the intensity range is less than or equal to the threshold.

3. The method of claim 1 wherein classifying each block includes classifying a block as a texture/edge block by comparing an intensity range with a threshold and determining the intensity range is greater than the threshold.

4. The method of claim 1 wherein an intensity range of the pixel intensity range-based block classification includes:
   a. determining a maximum intensity pixel value within a current block;
   b. determining a minimum intensity pixel value within the current block; and
   c. calculating a spatial variation by subtracting the minimum intensity pixel value from the maximum intensity pixel value.

5. The method of claim 1 further comprising classifying each pixel in a current block.

6. The method of claim 5 wherein classifying each pixel comprises:
   a. calculating a median of an intensity range within the current block;
   b. attributing a pixel in the current block to a first class if the pixel's intensity value is larger than the median; and
   c. attributing the pixel in the current block to a second class if the pixel's intensity value is less than or equal to the median.

7. The method of claim 6 wherein classifying each pixel further comprises comparing a pixel's class with a class of neighboring pixels and denoting the pixel as noisy if the pixel's class and the class of the neighboring pixels is the same.

8. The method of claim 1 wherein the vector difference-based dominant edge detection includes calculating a vector difference between two pixels.

9. The method of claim 1 wherein the vector difference-based dominant edge detection includes:
   a. determining a minimum difference among four directional differences;
   b. selecting a maximum difference with a direction orthogonal to the minimum difference direction;
   c. calculating an edge difference; and
   d. determining if a pixel belongs to a dominant edge.

10. The method of claim 1 wherein the content adaptive base weight generation includes calculating base weights for noisy pixels, edge pixels and texture pixels.

11. The method of claim 1 wherein the content adaptive base weight generation includes calculating base weights for a texture pixel with flat neighbor blocks.

12. The method of claim 1 wherein the content adaptive base weight generation includes adjusting base weights for chrominance blocks.

13. The method of claim 1 wherein the content adaptive final filter weight generation includes calculating a final weight for a texture/edge block.

14. The method of claim 1 wherein the content adaptive final filter weight generation includes calculating a final weight for a flat block.

15. The method of claim 1 wherein the adaptive texture and edge enhancement includes applying sharpness enhancement on denoted edge/texture pixels.

16. The method of claim 1 wherein the adaptive texture and edge enhancement includes:
   a. not applying sharpness enhancement if a current pixel belongs to a flat block;
   b. not applying sharpness enhancement if the current pixel is a noisy pixel;
   c. enhancing sharpness if the current pixel belongs to a dominant edge; and
   d. enhancing sharpness if the current pixel has not been filtered.

17. The method of claim 1 wherein the computing device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

18. A method of reducing image/video encoding artifacts and improving quality within a computing device, the method comprising:
   a. classifying each block within an image/video;
   b. determining filter coefficients for each pixel in a current block, wherein determining the filter coefficients includes docketing a dominant edge and classifying pixel intensity for a texture/edge block;
   c. filtering each pixel with the filter coefficients to remove noise; and
   d. applying an adaptive enhancement to enhance texture and edge pixels.

19. The method of claim 18 wherein classifying each block includes classifying a block as one of a flat block and a texture/edge block.

20. The method of claim 19 wherein classifying each block includes classifying a block as the flat block by comparing an intensity range with a threshold and determining the intensity range is less than or equal to the threshold.

21. The method of claim 19 wherein classifying each block includes classifying a block as the texture/edge block by comparing an intensity range with a threshold and determining the intensity range is greater than the threshold.

22. The method of claim 21 wherein determining the intensity range of the pixel includes:
   a. determining a maximum intensity pixel value within a current block;
   b. determining a minimum intensity pixel value within the current block; and c. calculating a spatial variation by subtracting the minimum intensity pixel value from the maximum intensity pixel value.

23. The method of claim 18 further comprising classifying each pixel comprising:
   a. calculating a median of an intensity range within the current block;
   b. attributing a pixel in the current block to a first class if the pixel's intensity value is larger than the median; and
   c. attributing the pixel in the current block to a second class if the pixel's intensity value is less than or equal to the median.

24. The method of claim 23 wherein classifying each pixel further comprises comparing a pixel's class with a class of neighboring pixels and denoting the pixel as noisy if the pixel's class and the class of the neighboring pixels is the same.

25. The method of claim 18 wherein determining the filter coefficients includes determining intensity difference between the current pixel and neighboring pixels for a flat block.

26. The method of claim 18 wherein detecting the dominant edge includes calculating a vector difference between two pixels.

27. The method of claim 18 wherein detecting the dominant edge includes:
   a. determining a minimum difference among four directional differences;
   b. selecting a maximum difference with a direction orthogonal to the minimum difference direction;
   c. calculating an edge difference; and
   d. determining if a pixel belongs to the dominant edge.

28. The method of claim 18 wherein applying the adaptive enhancement includes applying sharpness enhancement on denoted edge/texture pixels.

29. A method of reducing image/video encoding artifacts and improving quality within a computing device, the method comprising:
   a. classifying each block within an image/video;
   b. determining filter coefficients for each pixel in a current block;
   c. filtering each pixel with the filter coefficients to remove noise; and
   d. applying an adaptive enhancement to enhance texture and edge pixels, wherein applying the adaptive enhancement includes:
      i. not applying sharpness enhancement if a current pixel belongs to a flat block;
      ii. not applying sharpness enhancement if the current pixel is a noisy pixel;
      iii. enhancing sharpness if the current pixel belongs to a dominant edge; and
      iv. enhancing sharpness if the current pixel has not been filtered.

30. The method of claim 18 wherein the computing device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

31. A system for reducing image/video encoding artifacts and improving quality implemented with a computing device, the system comprising:
   a. a spatial variation extraction module configured for extracting spatial variation information for each block of an image/video;
   b. a block detection module operatively coupled to the spatial variation extraction module, the block detection module configured for classifying each block using the spatial variation information;
   c. a classification module operatively coupled to the spatial variation extraction module, the classification module configured for classifying each pixel in a current block using the spatial variation information;
   d. a dominant edge detection module operatively coupled to the block detection module, the dominant edge detection module configured for detecting a dominant edge;
   e. a neighbor block check module operatively coupled to the dominant edge detection module, the neighbor block check module configured for checking spatial variation of neighboring blocks of the current block;
   f. a base weight generation module operatively coupled to the neighbor block check module, the base weight generation module configured for generating base weights by combining results from detecting the dominant edge and checking the spatial variation of neighboring blocks;
   g. a filter coefficients generation module operatively coupled to the base weight generation module, the filter coefficients generation module configured for generating filter coefficients;
   h. a pixel-based filtering module operatively coupled to the filter coefficients generation module, the pixel-based filtering module configured for filtering pixels; and
   i. an adaptive enhancement module operatively coupled to the pixel-based filtering module, the adaptive enhancement module configured for applying an adaptive enhancement to enhance texture and edge pixels.

32. The system of claim 31 wherein the block detection module classifies a block as a flat block by comparing an intensity range with a threshold and determining the intensity range is less than or equal to the threshold.

33. The system of claim 31 wherein the block detection module classifies a block as a texture/edge block by comparing an intensity range with a threshold and determining the intensity range is greater than the threshold.

34. The system of claim 31 wherein the spatial variation information comprises an intensity range.

35. The system of claim 34 wherein determining the intensity range of the pixel includes:
   a. determining a maximum intensity pixel value within a current block;
   b. determining a minimum intensity pixel value within the current block; and
   c. calculating a spatial variation by subtracting the minimum intensity pixel value from the maximum intensity pixel value.

36. The system of claim 31 wherein the classification module classifies each pixel by:
   a. calculating a median of an intensity range within the current block;
   b. attributing a pixel in the current block to a first class if the pixel's intensity value is larger than the median; and
   c. attributing the pixel in the current block to a second class if the pixel's intensity value is less than or equal to the median.

37. The system of claim 36 wherein classifying each pixel further comprises comparing a pixel's class with a class of neighboring pixels and denoting the pixel as noisy if the pixel's class and the class of the neighboring pixels is the same.

38. The system of claim 31 wherein the dominant edge detector module detects the dominant edge by calculating a vector difference between two pixels.

39. The system of claim 31 wherein the dominant edge detector module detects the dominant edge by:
   a. determining a minimum difference among four directional differences;
   b. selecting a maximum difference with a direction orthogonal to the minimum difference direction;
   c. calculating an edge difference; and
   d. determining if a pixel belongs to the dominant edge.

40. The system of claim 31 wherein the base weight generation module calculates the base weights for noisy pixels, edge pixels and texture pixels.

41. The system of claim 31 wherein the base weight generation module calculates the base weights for a texture pixel with flat neighbor blocks.

42. The system of claim 31 wherein the base weight generation module adjusts the base weights for chrominance blocks.

43. The system of claim 31 wherein the adaptive enhancement modules applies sharpness enhancement on denoted edge/texture pixels.

44. The system of claim 31 wherein applying the adaptive enhancement includes:
   a. not applying sharpness enhancement if a current pixel belongs to a flat block;
   b. not applying sharpness enhancement if the current pixel is a noisy pixel;
   c. enhancing sharpness if the current pixel belongs to a dominant edge; and
   d. enhancing sharpness if the current pixel has not been filtered.

45. The system of claim 31 wherein the spatial variation extraction module, the block detection module, the classification module, the dominant edge detection module, the neighbor block check module, the base weight generation module, the filter coefficients generation module, the pixel-based filtering module and the adaptive enhancement module are implemented in software.

46. The system of claim 31 wherein the spatial variation extraction module, the block detection module, the classification module, the dominant edge detection module, the neighbor block check module, the base weight generation module, the filter coefficients generation module, the pixel-based filtering module and the adaptive enhancement module are implemented in hardware.

47. The system of claim 31 wherein the spatial variation extraction module, the block detection module, the classification module, the dominant edge detection module, the neighbor block check module, the base weight generation module, the filter coefficients generation module, the pixel-based filtering module and the adaptive enhancement module are implemented in at least one of software, firmware and hardware.

48. The system of claim 31 wherein the computing device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

49. A device comprising:
   a. a memory for storing an application, the application configured for:
      i. extracting spatial variation information for each block of an image/video;
      ii. classifying each block using the spatial variation information;
      iii. classifying each pixel in a current block using the spatial variation information;
      iv. detecting a dominant edge;
      v. checking spatial variation of neighboring blocks of the current block;
      vi. generating base weights by combining results from detecting the dominant edge and checking the spatial variation of neighboring blocks;
      vii. generating filter coefficients;
      viii. filtering pixels using the filter coefficients; and
      ix. applying an adaptive enhancement to enhance texture and edge pixels; and
   b. a processing component coupled to the memory, the processing component configured for processing the application.

50. The device of claim 49 wherein classifying each block includes classifying a block as a flat block by comparing an intensity range with a threshold and determining the intensity range is less than or equal to the threshold.

51. The device of claim 49 wherein classifying each block includes classifying a block as a texture/edge block by comparing an intensity range with a threshold and determining the intensity range is greater than the threshold.

52. The device of claim 49 wherein the spatial variation information comprises an intensity range.

53. The device of claim 52 wherein determining the intensity range of the pixel includes:
   a. determining a maximum intensity pixel value within a current block;
   b. determining a minimum intensity pixel value within the current block; and
   c. calculating a spatial variation by subtracting the minimum intensity pixel value from the maximum intensity pixel value.

54. The device of claim 49 wherein classifying each pixel comprises:
   a. calculating a median of an intensity range within the current block;
   b. attributing a pixel in the current block to a first class if the pixel's intensity value is larger than the median; and
   c. attributing the pixel in the current block to a second class if the pixel's intensity value is less than or equal to the median.

55. The device of claim 54 wherein classifying each pixel further comprises comparing a pixel's class with a class of neighboring pixels and denoting the pixel as noisy if the pixel's class and the class of the neighboring pixels is the same.

56. The device of claim 49 wherein detecting the dominant edge includes calculating a vector difference between two pixels.

57. The device of claim 49 wherein detecting the dominant edge includes:
   a. determining a minimum difference among four directional differences;
   b. selecting a maximum difference with a direction orthogonal to the minimum difference direction;
   c. calculating an edge difference; and
   d. determining if a pixel belongs to the dominant edge.

58. The device of claim 49 wherein generating the base weights includes calculating the base weights for noisy pixels, edge pixels and texture pixels.

59. The device of claim 49 wherein generating the base weights includes calculating the base weights for a texture pixel with flat neighbor blocks.

60. The device of claim 49 wherein generating the base weights includes adjusting the base weights for chrominance blocks.

61. The device of claim 49 wherein applying the adaptive enhancement includes applying sharpness enhancement on denoted edge/texture pixels.

62. The device of claim 49 wherein applying the adaptive enhancement includes:
   a. not applying sharpness enhancement if a current pixel belongs to a flat block;
   b. not applying sharpness enhancement if the current pixel is a noisy pixel;
   c. enhancing sharpness if the current pixel belongs to a dominant edge; and
   d. enhancing sharpness if the current pixel has not been filtered.

63. The device of claim 49 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

* * * * *